United States Patent [19]

Suzuki

[11] Patent Number: 4,917,040

[45] Date of Patent: Apr. 17, 1990

[54] COATING APPARATUS FOR COATING MAGNETIC COATING MATERIAL

[75] Inventor: Hideo Suzuki, Higashi-Kurume, Japan

[73] Assignee: Bellmatic, Ltd., Japan

[21] Appl. No.: 282,060

[22] Filed: Dec. 9, 1988

[30] Foreign Application Priority Data

Dec. 17, 1987 [JP] Japan ............................ 57-191908[U]

[51] Int. Cl.$^4$ ............................................. B05C 1/08
[52] U.S. Cl. ..................................... 118/212; 118/249
[58] Field of Search ............... 118/246, 248, 249, 253, 118/256, 258, 263, 621, 623, 656, 657, 212; 427/127, 128, 132

[56] References Cited

U.S. PATENT DOCUMENTS

| | | | |
|---|---|---|---|
| 3,872,829 | 3/1975 | Rattin | 118/623 X |
| 4,274,361 | 6/1981 | Sanders et al. | 118/623 X |
| 4,302,486 | 11/1981 | Harbs | 118/212 X |
| 4,453,492 | 6/1984 | Gorondy | 118/623 |
| 4,480,911 | 11/1984 | Itaya et al. | 118/621 X |
| 4,524,088 | 6/1985 | Fagen, Jr. et al. | 427/127 X |
| 4,638,281 | 1/1987 | Baermann | 118/657 X |
| 4,671,207 | 6/1987 | Hilbert | 118/657 |

FOREIGN PATENT DOCUMENTS 126630 6/1986 Japan ............................ 118/212

Primary Examiner—Richard L. Chiesa
Attorney, Agent, or Firm—Cushman, Darby & Cushman

[57] ABSTRACT

An apparatus for coating a magnetic coating material onto a substrate by using a gravure roll and a back up roll confronting with each other. The gravure roll has an internal space where at least two magnetic members are movably provided. Each of the magnetic members are connected to position adjusting means, so that positions of the magnetic members are controlled independent of each other. The position adjusting means has a portion extending within the internal space and a remaining portion extending out of the gravure roll. At the external portion of the position adjusting means, clamp members are provided for changing relative angular positions of the magnetic members.

3 Claims, 2 Drawing Sheets

COATING APPARATUS FOR COATING MAGNETIC COATING MATERIAL

BACKGROUND OF THE INVENTION

The present invention relates to a coating apparatus for coating a magnetic coating material onto a substrate so as to make a magnetic recording medium such as a magnetic tape, and more particularly, to a gravure coating apparatus capable of eliminating any unevenness of coating of the magnetic paint with respect to the substrate.

According to a conventional coating apparatus for coating a magnetic coating material onto a substrate available for a coating type magnetic tape, a predetermined amount of the magnetic coating material is sprayed onto the substrate by a nozzle or a feeder bar. Alternatively, there has been another coating apparatus using a gravure roll and a back-up roll. In the latter method, the coating material accumulated in an ink pan is captured onto engraved surface portions of the gravure roll and is transferred onto the tape substrate which is running through a space defined between the gravure roll and the back up roll.

However, according to such conventional coating apparatus, air remains at the engraved portions of the gravure roll if high speed coating is performed, so that a sufficient amount of the coating material cannot be retained within the engraved portions, or air is mixed into the coating material. As a result, uniform coating over the substrate is not attainable.

Further, even if an ordinary coating at a constant speed is performed, adhesion unevenness of the magnetic coating material to the gravure roll may occur due to variation in the viscosity of the coating material, to thereby disadvantageously cause coating unevenness onto the substrate. To avoid this drawback, the inventor has previously proposed a coating apparatus in which magnetic force is applied to peripheral surfaces of the gravure roll and the back up roll as disclosed in Japanese Patent Application No 59-247370 and now Patent No. 61-126630. According to this proposal, magnets are accommodated in both a cup roll (gravure roll) and the back up roll, so that magnetic force is given to the respective peripheral surfaces of these rolls. Further, with respect to the cup roll, first and second magnets are disposed at a position adjacent to a contact portion relative to the substrate and a position interior of a contact portion relative to a magnetic recording liquid (magnetic coating material) accumulated in a pan, respectively. With this structure, non-uniform adhesion of the magnetic coating material to the cup roll has been overcome to some extent.

However, according to the coating apparatus, there has been inherent disadvantage in that a shape of a liquid accumulating portion defined at a contact portion between the cup roll and the substrate is still unstable due to imbalance between the increasing rotational speed of the cup roll and the viscosity of the coating material. Due to such unstable shape of the liquid mass at the contact portion, coating uniformity over the substrate would be degraded.

SUMMARY OF THE INVENTION

It is an object of the present invention to overcome the above-described drawbacks and disadvantages, and to provide an improved coating apparatus capable of eliminating adhesion unevenness of a magnetic coating material to a gravure roll.

Another object of this invention is to provide such coating apparatus which can easily provide a stabilized liquid accumulating amount at a contact portion between the gravure roll and a substrate dependent on coating condition.

Still another object of this invention is to provide such improved coating apparatus with an adjusting mechanism in which uniform coating to the substrate is attainable.

These and other objects of this invention will be attained by providing a coating apparatus for coating a coating material onto a substrate, the coating material containing magnetic particles for serving as a magnetic coating material, the apparatus comprising: a gravure roll for applying the coating material onto the substrate, the gravure roll being provided with a main body having a peripheral surface; a back up roll disposed in confrontation with the gravure roll for urging the substrate toward the gravure roll; at least two magnetic members disposed in the main body, the magnetic members being positioned adjacent to the peripheral surface: and, position adjusting means disposed in the main body for adjusting positions of the magnetic members independent of each other.

With regard to the position adjusting means, it includes a rotatable position adjusting shaft for supporting one of the magnetic members within the main body: a rotatable position adjusting tube for supporting a remaining one of the magnetic members within the main body, the position adjusting shaft and the position adjusting tube being provided coaxial with each other and extending outwardly relative to the gravure roll; a first clamp member attached to the externally extending portion of the position adjusting shaft; a first handle connected to the first clamp member; a second clamp member attached to the externally extending portion of the position adjusting tube; and a second handle connected to the second clamp member.

DESCRIPTION OF THE PREFERRED EMBODIMENT

Figure 1:
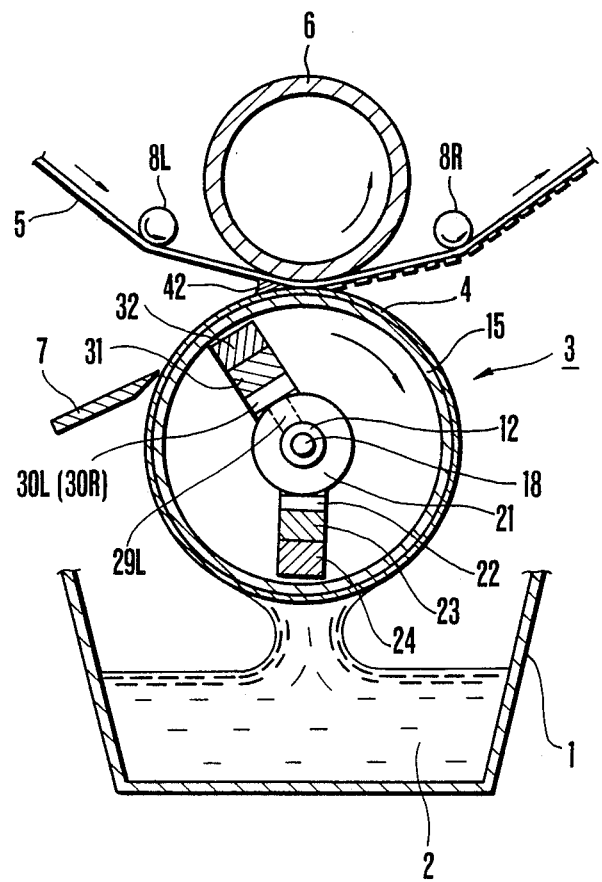
FIG. 1 is a cross-sectional elevation showing an essential portion of a coating apparatus according to the present invention; and, FIG. 2 is a cross-sectional view showing a gravure roll employed in the coating apparatus according to this invention.

One embodiment according to this invention will be described with reference to the accompanying drawings. As shown in FIG. 1, an ink pan 1 is provided to accumulate therein a magnetic coating material 2. The magnetic coating material 2 contains magnetic powders uniformly dispersed in binders and additives. A gravure roll 3 is disposed above a liquid surface of the magnetic coating material 2. The gravure roll 3 has an outer peripheral surface formed with engraved pattern 4. Further, a film substrate 5 formed of polyethyelene terephthalate (PET) is travelled over the gravure roll 3 in contact with the engraving surface 4. Above the substrate 5, a back up roll 6 is rotatably disposed, so that the substrate 5 is urged toward the gravure roll 3. The back up roll 6 has its outer peripheral surface formed with a rubber material.

A doctor blade 7 is provided at a position adjacent to the engraving surface pattern 4 so as to scrape excessive magnetic coating material 2 from the surface of the gravure roll 3. Further, guide rolls 8R, 8L are provided so as to smoothly move the substrate 5.

Figure 2:
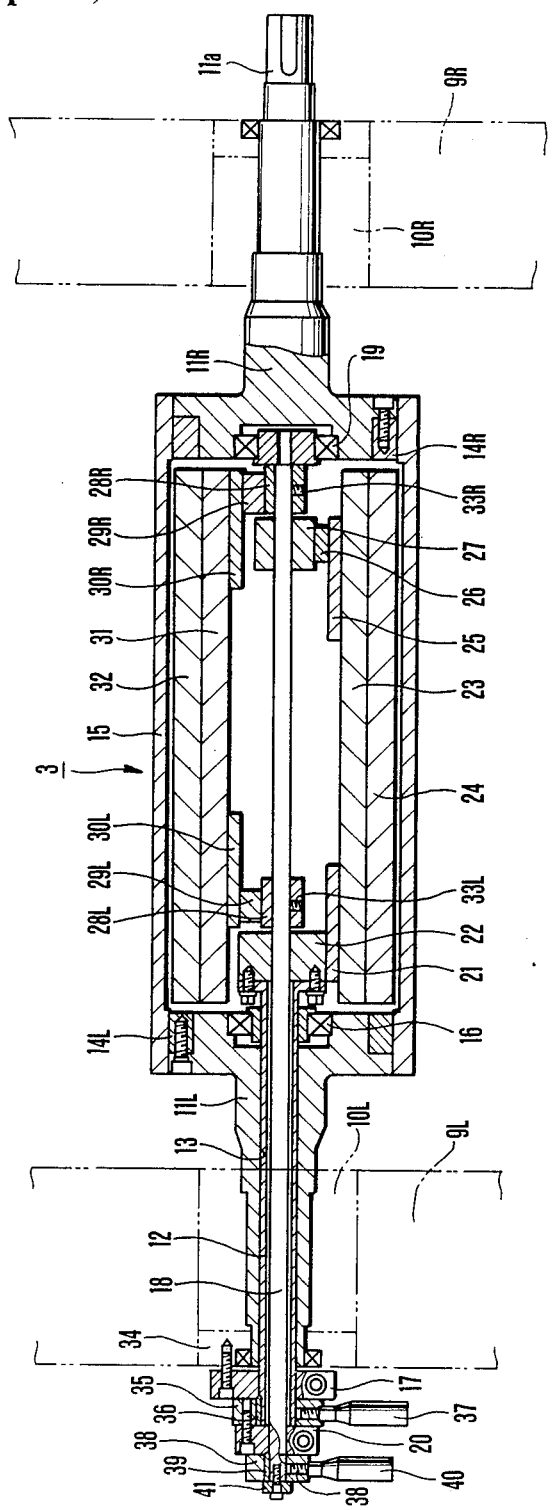

Details of the gravure roll 3 are shown in FIG. 2. The gravure roll 3 has headers 11R, 11L rotatably supported by frames 9R, 9L of the coating apparatus through housing units 10R, 10L each provided with a bearing. At one end of one of the headers 11R (right header in FIG. 2), a rotation shaft 11a is provided which is connectable with a power transmission mechanism coupled to a motor (not shown). At one end of the other header 11L (left header in FIG. 2), an insertion bore 13 is formed, into which a position adjusting tube 12 is inserted. Confronting sides of the headers 11R, 11L (inner sides) are each fixed to each of annular attachment rings 14R, 14L by means of bolts, and a gravure roll main body 15, formed with the engraving pattern 4, is fixedly connected to the attachment rings 14R 14L.

One distal end of the position adjusting tube 12 extends into an interior of the main body 15 of the gravure roll. The end portion is supported by a bearing 16 disposed at the header 11L. The other distal end of the position adjusting tube extends externally with respect to the header 11L, and the other end portion is supported by a first clamp member 17. Further, a position adjusting shaft 18 extends through a hollow space of the position adjusting tube 12. The shaft 18 is loosely inserted thereinto, and extends along a length of the main body 15. One end of the shaft 18 is rotatably supported by a bearing 19 disposed at the header 11R, and the other end of the shaft 18 further extends out of the other end of the position adjusting tube 12 and is supported by a second clamp member 20. That is, the headers 11R, 11L and the main body 15 of the gravure roll are provided rotatable relative to the position adjusting tube 12 and the position adjusting shaft 18.

At the one distal end of the position adjusting tube 12, which one end confronts the interior of the main body 15 of the gravure roll, a retainer ring 21 is attached, and one end portion of a magnetic member 24 is secured to the retainer ring 21 through a side plate 22 and a core member 23. The magnetic member 24 and the core 23 have other end portions rotatably secured to the position adjusting shaft 18 through a side plate 25, a retainer plate 26 and a retainer ring 27. Further, the position adjusting shaft 18 has a part extending within the interior of the main body 15 of the gravure roll, with the part having two end portions within the interior. At the two end portions, there are rotatably provided retainer rings 28R, 28L, respectively and a second magnetic member 32 is attached to the retainer rings 28R, 28L through attachment plates 29R, 29L, side plates 30R, 30L and a core member 31. The retainer rings 28R, 28L are temporarily fixedly secured to the position adjusting shaft 18 by means of set bolts 33R, 33L. The magnetic members 24, 32 are positioned adjacent the main body 15 with a proper space therebetween. The first clamp member 17 is in the form of a ring which is selectively clampable with respect to the position adjusting tube 12 by a bolt. The clamp member 17 is fixed to a bearing holder 34 of the housing unit 10L by means of a bolt. At a position adjacent the clamp member 17, a handle member 35 is disposed over the position adjusting tube 12, and is fixed by a saddle key 36. A handle member 35 is provided with a manipulation handle 37 so that the position adjusting tube 12 is rotatable about its axis. Further, the second clamp member 20 has a ring shape which is selectively clampable with respect to the position adjusting shaft 18 by a bolt. The clamp member 20 is fixed to the handle member 35 by a bolt. Furthermore, at a position adjacent the clamp member 20, a handle member 38 is disposed over the position adjusting shaft 18, and is fixed at a position by a saddle key 39. The handle member 38 has a manipulation handle 40 to rotate the position adjusting shaft 18 about its axis. A cap 41 is fixed to a planar end of the position adjusting shaft 18 by a bolt so as to prevent the handle member 38 from releasing from the shaft 18.

With the above desired structure, the magnetic members 24 and 32 are connected to the position adjusting tube 12 and the position adjusting shaft 18, respectively. As shown in FIG. 1, these magnetic members are disposed radially with respect to a central axis of the position adjusting shaft 18. These magnetic members are movable independent of each other so as to control their positions.

According to the coating apparatus of this invention, when the motor is energized, the gravure roll 3 is rotated while the relative positions of the magnetic members 24, 32 are maintained unchanged. That is, as shown in FIG. 1, when the gravure roll 3 and the substrate 5 are rotated or moved in directions indicated by arrows, the magnetic force of the magnetic member 24 is applied to the magnetic particles contained in the magnetic coating material when the magnetic member 24 is brought into confrontation with the ink surface, so that the magnetic coating material in the ink pan 1 is forcibly attracted to the engraving pattern formed at the main body 15 of the gravure roll. In this attraction, air previously captured in the engraving pattern 4 is completely replaced by the coating material. Excessive magnetic coating material 2 adhered to the main body 15 is then subjected to scraping by the doctor blade 7, so that an optimum amount of the coating material is brought into introduction with the substrate where ink transfer occurs.

In this operation, a liquid accumulating portion 42 is created at a minute space defined between the gravure roll 3 and the inlet side of the substrate 5. This accumulation amount may influence the ink transferring characteristics to the substrate, and therefore, uniform ink transfer may not be obtainable if the accumulation amount is varied. In this connection, according to the present invention the bolt for fastening the clamp member 17 is unfastened so as to allow the position adjusting tube 12 to be rotatable, and the handle 37 of the handle member 35 is manipulated so as to provide optimum angular position of the magnetic member 24 connected to the position adjusting tube 12 while observing the condition of the liquid accumulation mass 42 and the adhesion state of the magnetic material to the gravure roll 3. Thereafter, the clamp member 17 is clamped to fix the angular position of the magnet 24. Then, the bolt associated with the clamp member 20 is unfastened so as to allow free rotation of the position adjusting shaft 18, and the handle 40 of the handle member 38 is manipulated so as to provide optimum angular position of the magnetic member 32 connected to the position adjusting shaft 18 while observing the condition of the liquid accumulation mass 42 and the adhesion state of the magnetic material to the gravure roll 3. Thereafter, the clamp member 20 is clamped to fix the optimum angular position of the magnetic member 32.

According to the above described embodiment, the present inventive concept is applied to a conventional direct gravure roll coating system. However, the present invention is also available when combining with a conventional feeder bar system which employs a nozzle.

As described above, the present invention has been made on the basis of particular requirements, i.e., for uniform adhesion of the magnetic coating material to the gravure roll 3 during the coating operation and to stabilize the amount of liquid accumulation 42 during the coating operation. For this, attention is drawn to the position adjustments to the magnetic member 24 which applies magnetic force to the magnetic coating material 2 supplied to the gravure roll 3 and to the magnetic member 32 which is positioned adjacent to the liquid accumulation portion 42 and applies magnetic force thereto in order to stabilize the amount of the liquid accumulation portion 42. Therefore, according to the invention, positions of the magnetic members 24, 32 can be adjusted independent of each other by means of external manipulation even under an extremely high speed coating operation, so that optimum positions of these magnetic members 24 and 32 are determined, and a magnetic tape undergoing uniform coating is easily and surely obtained.

In view of the foregoing, according to the present invention, at least two magnetic members are accommodated in the gravure roll at positions close to the main body of the gravure roll, and these magnetic members are subjected to positional adjustments independent of each other. Accordingly, the present invention can provide optimum positions for the magnetic members dependent on various coating conditions, and uniform coating is carried out even under high speed coating, to thereby provide productivity.

While the invention has been described in detail and with reference to a specific embodiment, it would be apparent to those skilled in the art that various changes and modifications can be made therein without departing from the spirit and scope of the invention.

What is claimed is:

1. A coating apparatus for coating a coating material onto a substrate, said coating material containing magnetic particles for serving as a magnetic coating material, said apparatus comprising:

a gravure roll for applying said coating material onto said substrate, said gravure roll being provided with a main body having a peripheral surface;

a back up roll disposed in confrontation with said gravure roll for urging said substrate toward said gravure roll;

at least two magnetic members disposed in said main body, said magnetic members being positioned adjacent to said peripheral surface; and, position adjusting means disposed in said main body for adjusting positions of said at least two magnetic members independent of each other and for adjusting the position of said at least two magnetic members to be adjacent to any portion of said peripheral surface.

2. A coating apparatus for coating a coating material onto a substrate, said coating material containing magnetic particles for serving as a magnetic coating material, said apparatus comprising:

a gravure roll for applying said coating material onto said substrate, said gravure roll being provided with a main body having a peripheral surface;

a back up roll disposed in confrontation with said gravure roll for urging said substrate toward said gravure roll;

at least two magnetic members disposed in said main body, said magnetic members being positioned adjacent to said peripheral surface; and, position adjusting means disposed in said main body for adjusting positions of said magnetic members independent of each other, said position adjusting means including:

at least one rotatable position adjusting shaft for supporting at least one of said at least two magnetic members within said main body;

a rotatable position adjusting tube for supporting a remaining one of said at least two magnetic members within said main body, said at least one position adjusting shaft and said position adjusting tube being provided coaxial with each other and extending outwardly relative to said gravure roll;

a first clamp member attached to the externally extending portion of said at least one position adjusting shaft;

a first handle connected to said first clamp member;

a second clamp member attached to the externally extending portion of said position adjusting tube; and a second handle connected to said second clamp member.

3. A coating apparatus for coating a coating material onto a substrate, said coating material containing magnetic particles for serving as a magnetic coating material, said apparatus comprising:

a gravure roll for applying said coating material onto said substrate, said gravure roll being provided with a main body having a peripheral surface;

a back up roll disposed in confrontation with said gravure roll for urging said substrate toward said gravure roll;

at least two magnetic members disposed in said main body, said magnetic members being fixed at positions adjacent to and separated from said peripheral surface; and position adjusting means disposed in said main body for adjusting the fixed positions of said at least two magnetic members independent of each other.

* * * * *